(12) United States Patent
Yoshinari et al.

(10) Patent No.: US 8,199,296 B2
(45) Date of Patent: Jun. 12, 2012

(54) ANTIGLARE FILM

(75) Inventors: Tomo Yoshinari, Tokyo (JP); Yusuke Tochigi, Tokyo (JP); Takashi Nishihara, Tokyo (JP); Hideaki Honma, Tokyo (JP)

(73) Assignee: Toppan Printing Co., Ltd. (JP)

( * ) Notice: Subject to any disclaimer, the term of this patent is extended or adjusted under 35 U.S.C. 154(b) by 739 days.

(21) Appl. No.: 12/269,689

(22) Filed: Nov. 12, 2008

(65) Prior Publication Data

US 2009/0128917 A1 May 21, 2009

(30) Foreign Application Priority Data

Nov. 16, 2007 (JP) ................................ 2007-297751

(51) Int. Cl.
*G02F 1/1335* (2006.01)
*G02B 27/00* (2006.01)

(52) U.S. Cl. .................. 349/137; 349/112; 359/601

(58) Field of Classification Search .................. 349/137, 349/112; 359/601
See application file for complete search history.

(56) References Cited

U.S. PATENT DOCUMENTS
2004/0032546 A1* 2/2004 Ito .................................. 349/96

FOREIGN PATENT DOCUMENTS

| JP | 06-18706 | 1/1994 |
|---|---|---|
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-260748 | 9/2003 |
| JP | 2004-004777 | 1/2004 |

* cited by examiner

*Primary Examiner* — Wen-Ying P Chen
(74) *Attorney, Agent, or Firm* — Squire Sanders (US) LLP

(57) ABSTRACT

An embodiment of the present invention is an antiglare film which includes an antiglare layer having particles A, particles B, and a binder matrix on a transparent substrate. A difference in refractive index between the particles A and the binder matrix ($|n_A-n_M|$) is 0.060 or less. A difference in refractive index between the particles B and the binder matrix ($|n_B-n_M|$) is in the 0.080-0.300 range. An average diameter (unit: μm) of the particles B ($r_B$) is in the 0.5-5.0 μm range. The product value $|n_B-n_M|w_BH$, which is obtained by multiplying a difference in refractive index between said particles B and said binder matrix ($|n_B-n_M|$) by a content (part by weight) of said particles B as against 100 parts by weight of said binder matrix ($w_B$) and an average thickness (unit: μm) of said antiglare layer (H) is in the 10.0-15.0 range.

2 Claims, 5 Drawing Sheets

ANTIGLARE FILM

CROSS REFERENCE TO RELATED APPLICATION

This application is based on and claims the benefit of priority from the Japanese Patent Application number 2007-297751, filed on Nov. 16, 2007; the entire contents of which are incorporated herein by reference.

BACKGROUND OF THE INVENTION

1. Field of the Invention

This invention relates to an antiglare film which is preferably applied on a surface of a twisted nematic (TN) type or vertical alignment (VA) type of transmission liquid crystal display (LCD).

2. Description of the Related Art

In the field of displays such as LCD, CRT (Cathode Ray Tube) display, ELD (Electroluminescence Display), and PDP (Plasma Display), providing on the display surface an antiglare film having a concave-convex structure on the surface is known as a means for preventing the degradation of visibility caused by reflection of external light on the display surface during viewing.

The following methods are known for producing such antiglare films:
a method of forming a concave-convex structure on an antiglare film surface by emboss processing;
a method of coating a coating liquid obtained by admixing particles to a binder matrix forming material and dispersing the particles in the binder matrix, thereby forming a concave-convex structure on an antiglare film surface.

In an antiglare film having on the surface thereof a concave-convex structure formed by the above-described methods, the external light falling on the antiglare film is scattered by the concave-convex structure of the surface. As a result, the image of external light becomes smudgy and the degradation of visibility caused by the reflection of external light on the display surface can be prevented.

In the antiglare film in which convexities and concavities have been formed on the surface by emboss processing, surface convexities and concavities can be completely controlled. As a result, reproducibility is good. However, the problem is that where defects or foreign matter are present on the emboss roll, the defects spaced by a roll pitch appear on the film.

On the other hand, an antiglare film using a binder matrix and particles can be produced by using fewer operations than the antiglare film employing the emboss processing. As a result, the antiglare film can be manufactured at a low cost. Accordingly, antiglare films of a variety of forms in which particles are dispersed in a binder matrix are known (Japanese Patent Application Publication (JP-A-6-18706) No. 6-18706).

Various techniques have been disclosed with respect to an antiglare film using a binder matrix and particles. For example, the following methods for producing antiglare films using a binder matrix and particles have been disclosed:
a method using a binder matrix resin, spherical particles, and particles of irregular shape (JP-A-2003-260748);
a method using a binder matrix resin and particles of a plurality of different diameters (JP-A-2004-004777);
a method of using a film having surface convexities and concavities in which the cross-sectional area of convexities is specified (JP-A-2003-004903).

The following methods have also been disclosed:
a method of using internal scattering in combination with external scattering and setting an internal haze of an antiglare film to 1-15% and a surface haze to 7-30% (JP-A-11-305010);
a method of using a binder resin and particles with a size of 0.5-5 μm and setting the difference in refractive index between the resin and the particles to 0.02-0.2 (JP-A-11-326608);
a method of using a binder resin and particles with a size of 1-5 μm and setting the difference in refractive index between the resin and the particles to 0.05-0.15, and a method in which the properties of the solvent used and the surface roughness are set within the predetermined ranges (JP-A-2000-338310);
a method of using a binder resin and a plurality of particles and setting the difference in refractive index between the resin and the particles to 0.03-0.2 (JP-A-2000-180611);
a method of setting a surface haze to 3 or more and setting the difference between a haze value in the normal direction and a haze value in the direction at ±60° to 4 or less with the object of reducing the variations in hue and the decrease in contrast occurring when the viewing angle changes (JP-A-11-160505).

Thus, antiglare films of various configurations created to attain a variety of purposes have been disclosed.

The properties of antiglare films used for the front surface of displays vary depending on the type and application etc. of the display. In other words, the optimum antiglare film depends on the display category, resolution or purpose of use. Therefore, a large number of different types of antiglare films are required according to the application of the display.

Among various display devices, a TN type LCD and VA type LCD often have a problem of an occurrence of a color change and/or a gray scale inversion of an image presented on a display depending on the arrangement of the display device and observer's location. In other words, an observer receives a different colored image when being in front of the display from an image which is received when being at a point in an oblique direction.

It is an object of the present invention to provide an antiglare film having not only an antiglare function of preventing external light from falling on the display surface when applied on a surface of a TN type LCD or a VA type LCD but also a color compensation function of preventing a gray scale inversion and a color change which can be perceived from a point in an oblique direction.

SUMMARY OF THE INVENTION

According to one aspect of the present invention, there is provided an antiglare film which includes an antiglare layer having a binder matrix, particles A and particles B on a transparent substrate, $|n_A - n_M|$ namely a difference in refractive index between the particles A (refractive index: $n_A$) and the binder matrix (refractive index: $n_M$) being 0.060 or less, $|n_B - n_M|$ namely a difference in refractive index between the particles B (refractive index: $n_B$) and the binder matrix (refractive index: $n_M$) being in the 0.080-0.300 range, $r_B$ namely an average diameter of the particles B being in the 0.5-5.0 μm range, a product value $|n_B - n_M| w_B H$, which is obtained by a multiplication of the $|n_B - n_M|$, $w_B$ (namely, part by weight value of the particles B which are contained in the antiglare layer, as against 100 parts by weight of the binder matrix therein) and H (namely, an average thickness (unit: μm) of the antiglare layer), being in the 1.5-15.0 range.

According to another aspect of the present invention, there is provided a transmission type LCD which includes the antiglare film of the present invention, a polarizing plate, a TN or VA type liquid crystal cell, a polarizing plate, and a backlight unit, in the order of this description from an observer side.

DETAILED DESCRIPTION OF THE INVENTION

Figure 1:
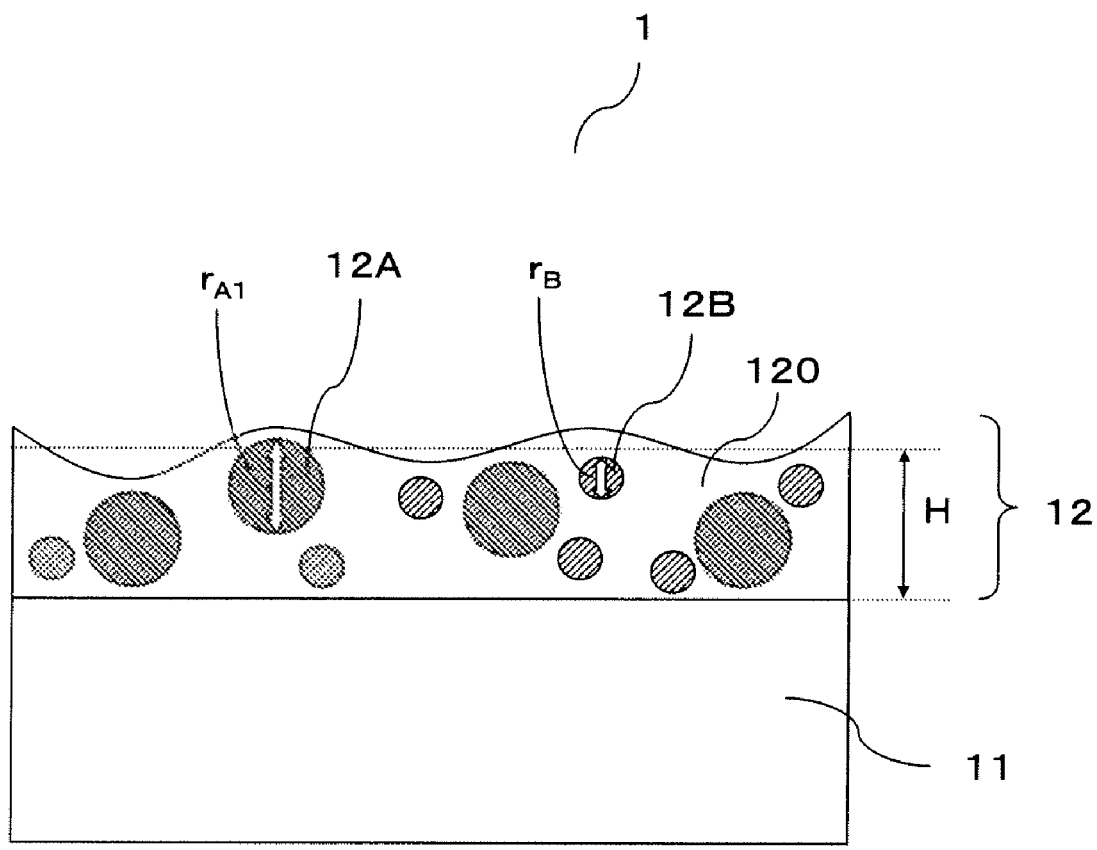
FIG. 1 is a cross-sectional schematic view of the antiglare film in accordance with the present invention.

The present invention is described below. FIG. 1 is a cross-sectional schematic view of the antiglare film in accordance with the present invention. An antiglare film (1) in accordance with the present invention has an antiglare layer (12) on a transparent substrate (11). The antiglare layer of the antiglare film of the present invention includes a binder matrix (120), particles A (12A) and particles B (12B).

In the antiglare film in accordance with the present invention, the antiglare layer (12) includes the particles A (12A) and particles B (12B). The particles A (12A) herein are used principally for the purpose of producing a concave-convex structure on a surface of the antiglare layer, which provides the layer with an antiglare function. Meanwhile, the particles B are used chiefly in order to provide a color compensation function to the antiglare layer.

The particles B, which are used in order to provide a color compensation function to the antiglare layer, are described hereafter. Particles which have small backscatter intensity and generate strong forward and wide-angle scattering from incident light can be used as the particles B, which are used in order to provide a color compensation function. In other words, particles which generate Mie scattering can be used as particles B. Particles having a difference ($|n_B-n_M|$) in the refractive index thereof ($n_B$) a value in the 0.080-0.300 range from that of the binder matrix ($n_M$) and also having an average diameter ($r_B$) in the 0.50-5.0 μm range can be used as particles B (12B) which generate strong forward and wide-angle scattering from incident light.

If $|n_B-n_M|$, the difference in refractive index between the particles B and binder matrix, is less than 0.08, it is impossible to provide the antiglare layer with a color compensation function because the antiglare layer does not sufficiently scatter incident light. Meanwhile, if $|n_B-n_M|$, the difference in refractive index between the particles B and binder matrix, exceeds 0.300, the antiglare layer becomes whitely clouded, which is not suitable for using on an LCD surface.

In addition, if the average diameter of the particles B ($r_B$) is less than 0.5 μm, the antiglare layer becomes whitely clouded and unsuitable for using on an LCD surface since the antiglare layer generates more backward scattering and less forward wide-angle scattering. Meanwhile, if the average diameter of the particles B ($r_B$) is more than 5.0 μm, it is impossible to provide the antiglare layer with a color compensation function because incident light is scattered by the antiglare layer with a small scattering angle Hence, an antiglare layer whereby incident light is scattered forward with a wide angle and a gray scale inversion and/or a color change, which can be perceived when an LCD is observed in an oblique direction, is prevented can be provided by using the particles B having the $r_B$, the average diameter thereof, in the 0.5-5.0 μm range, and the $|n_B-n_M|$, the difference in refractive index between the particles B and binder matrix, in the 0.080-0.300 range.

In accordance with the present invention, the particles B is added to the antiglare layer in a way that a product value $|n_B-n_M|w_BH$, which is obtained by a multiplication of the $|n_B-n_M|$ (i.e. the difference in refractive index between the particles B and the binder matrix), $w_B$ (i.e. part by weight of the particles B which are contained in the antiglare layer, as against 100 parts by weight of the binder matrix therein) and H (i.e. an average thickness (unit: μm) of the antiglare layer), are in the 1.5-15.0 range. When the $|n_B-n_M|w_BH$ is less than 1.5, the antiglare layer cannot possess a color compensation function because of a lack of a sufficient light diffusing property. Meanwhile, when the $|n_B-n_M|w_BH$ exceeds 15.0, the antiglare layer becomes whitely clouded and unsuitable for an application on an LCD surface because it excessively diffuses falling in light. It is also a problem that an antiglare film having such an antiglare layer decreases luminance when applied on a front surface of an LCD.

It is still possible to form a concave-convex structure on the surface of the antiglare layer by the particles B which chiefly provides a color compensation function. If a concave-convex structure is formed with the particles B, however, a significant quantity of the particles B are required and the antiglare layer will become whitely clouded resulting in a decrease of luminance in a front direction of the LCD. This decrease is brought about by the fact that the particles B which is used to provide a color compensation function requires a difference of 0.08 or more in refractive index between the particles B and the binder matrix. The inventors have made the present invention of an antiglare film which includes both an antiglare function and a color compensation function so as to be preferably used on the front surface of an LCD by means of combined use of the particles B, which provides the antiglare layer with a color compensation function, and the particles A, which provides the antiglare layer with an antiglare function.

The particles A which form a concave-convex structure to provide an antiglare function to the surface of the antiglare layer is described hereafter. It is a feature of the particles A (12B) that there is a difference ($|n_A-n_M|$) of 0.060 or less between the refractive index thereof ($n_A$) and that of the binder matrix ($n_M$). By using the particles A in conformity with the condition of the difference $|n_A-n_M|$ being 0.060 or less, it becomes possible to efficiently form a concave-convex structure on an antiglare surface in order to provide an antiglare function. If the difference in refractive index $|n_A-n_M|$ exceeds 0.060, the antiglare layer becomes whitely clouded and unsuitable for an application on an LCD surface since incident light is scattered by both the particles A and particles B. There is also a problem of a decrease in luminance in a frontal direction if this antiglare film is arranged on a front surface of an LCD.

In accordance with the present invention, a refractive index of the binder matrix ($n_M$) means a refractive index of a film created with the binder matrix. In the case where the binder matrix is made from a binder matrix forming material of an ionized radiation cured type, this refractive index $n_M$ means the refractive index after the binder matrix forming material is coated and cured by an exposure to ionized radiation. Thus, a refractive index of the binder matrix is equal to a refractive index of the other part of the antiglare layer than the particles A and particles B. Any refractive index of the binder matrix ($n_M$), particles A ($n_A$) and particles B ($n_B$) can be obtained by means of Becke line detection method or immersion method.

Meanwhile, an average diameter of the particles B ($r_B$) of the present invention can be obtained with a light scattering particle size distribution analyzer.

In addition, in accordance with the present invention, it is preferred that the product value $|n_B-n_M|w_B H$, which is obtained by a multiplication of the $|n_B-n_M|$ (i.e. the difference in refractive index between the particles B and the binder matrix), $w_B$ (i.e. part by weight of the particles B which are contained in the antiglare layer, as against 100 parts by weight of the binder matrix therein) and H (i.e. an average thickness (unit: μm) of the antiglare layer) be in the 10.0-15.0 range. A $|n_B-n_M|w_B H$ in the 10.0-15.0 range enables the antiglare film to be provided with a high level color compensation function.

Moreover, in accordance with the present invention, it is preferred that a product value $(|n_A-n_M|w_A+|n_B-n_M|w_B)H$, which is obtained by multiplying a sum of $|n_A-n_M|w_A$ (i.e. a product of $|n_A-n_M|$, a difference in refractive index between the particles A and the binder matrix, and $w_A$, part by weight of the particles A which are contained in the antiglare layer, as against 100 parts by weight of the binder matrix therein) and $|n_B-n_M|w_B$ (i.e. a product of $|n_B-n_M|$, a difference in refractive index between the particles B and the binder matrix, and $w_B$, part by weight of the particles B which are contained in the antiglare layer, as against 100 parts by weight of the binder matrix therein) by H (i.e. an average thickness (unit: μm) of the antiglare layer) be in the 2.0-30.0 range.

In accordance with the present invention, a difference in refractive index between the particles A and the binder matrix ($=|n_A-n_M|$) is determined to be 0.060 or less. In the case where the refractive index of the binder matrix and the particles A are not the same, and when a large amount of particles A are contained in the antiglare layer, however, a scattering of light incident upon the antiglare layer by the particles A is no longer negligible. Thus, in the case where the value $(|n_A-n_M|w_A+|n_B-n_M|w_B)H$ is more than 30.0, the antiglare layer may become whitely clouded and unsuitable for an application on a surface of an LCD. Meanwhile, in the case where the value $(|n_A-n_M|w_A+|n_B-n_M|w_B)H$ is less than 2.0, a glaring phenomenon is sometimes observed on a displayed image when the antiglare layer is applied on a front surface of an LCD.

Further in accordance with the present invention, it is preferred that the value ($w_A+w_B$), a sum of a content of the particles A ($w_A$ (part by weight)) in the antiglare layer as against 100 parts by weight of the binder matrix and a content of the particles B ($w_B$ (part by weight)) in the antiglare layer as against 100 parts by weight of the binder matrix, is in the 5-40 parts by weight range. If the value ($w_A+w_B$), the sum of the content of the particles A and the particles B as against 100 parts by weight of the binder matrix, is less than 5 parts by weight, a sufficient concave-convex structure for scattering external light cannot be produced on a surface of the antiglare layer because of the lack of particles per volume. If the value ($w_A+w_B$), the sum of the content of the particles A and the particles B, exceeds 40 parts by weight, particles tend to be agglutinated with a number of particles per volume and a phenomenon of white blurring may occur on an LCD surface when external light such as fluorescent light falls on the antiglare surface because an excessive concave-convex structure is formed on the antiglare layer. In addition, an excessive concave-convex structure is easily damaged on the convex part thereof when rubbed. Thus, the abrasion resistance of the antiglare film tends to decrease.

Moreover, in accordance with the present invention, it is preferred that $r_A/H$, a quotient value of an average diameter of the particles A ($r_A$) by an average thickness of the antiglare layer (H), is in the 0.20-0.90 range. The average diameter in this range makes it possible to efficiently form the concave-convex structure on the antiglare layer surface. If the $r_A/H$ is less than 0.20, it is sometimes difficult to form the concave-convex structure on the antiglare layer. Meanwhile, if the $r_A/H$ is more than 0.90, a large convex part may be produced on the antiglare layer surface resulting in an excessive concave-convex structure whereby white blurring phenomenon occurs when external light such as fluorescent light falls on the surface of the antiglare layer. In addition, the large convex part and the excessive concave-convex structure on the antiglare layer may cause a decrease in abrasion resistance of the antiglare film.

An average diameter of the particles A ($r_A$) of the present invention can be measured with a light scattering particle size distribution analyzer similar to the average diameter of the particles B ($r_B$). In addition, in accordance with the present invention, the average thickness of the antiglare layer (H) means an average value in thickness of the antiglare layer including the concave-convex surface. The average thickness can be measured with an electronic micrometer or an automated microgeometry measuring instrument.

Figure 2:
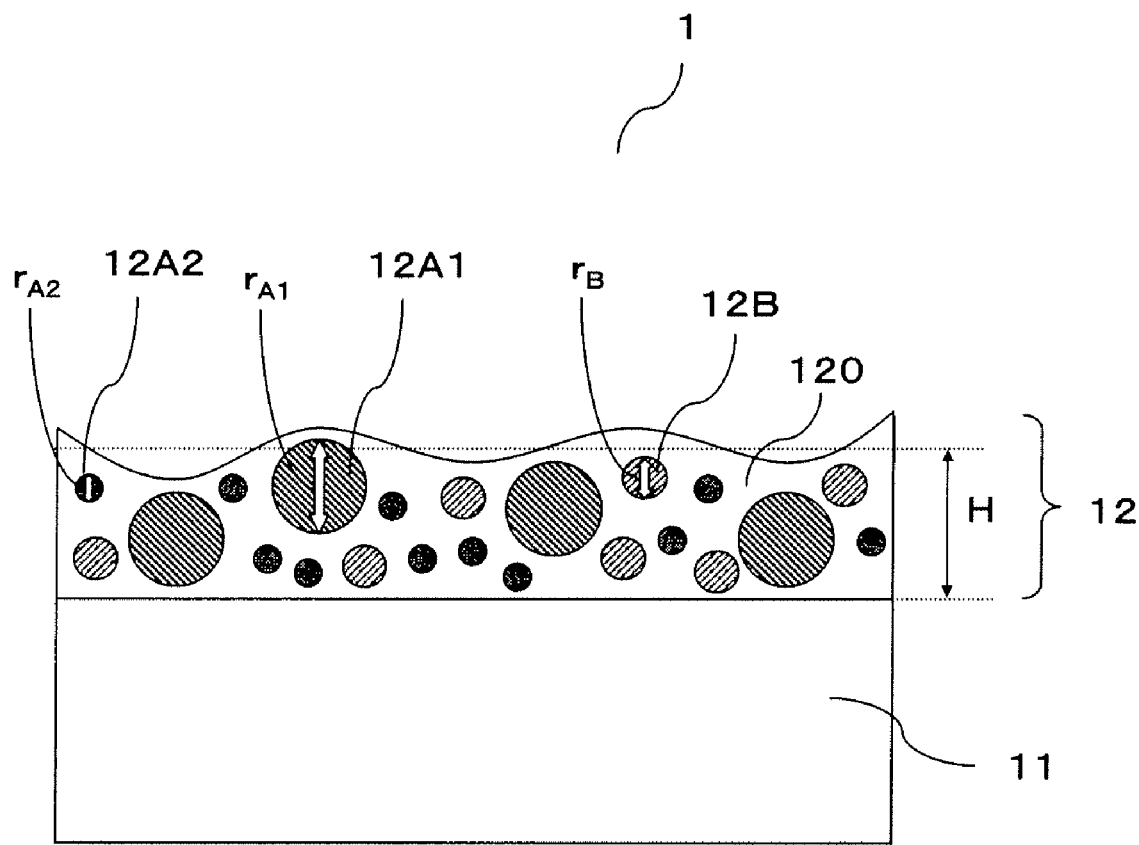
FIG. 2 is another cross-sectional schematic view of an antiglare film in accordance with the present invention.

FIG. 2 is an exemplary cross-sectional diagram showing another embodiment of the antiglare film of the present invention. The antiglare film (1) in this embodiment of the FIG. 2 has an antiglare layer (12) on a transparent substrate (11). The antiglare layer (12) in the antiglare film (1) herein includes a binder matrix (120), the particles A1 (12A1), the particles A2 (12A2) and the particles B (12B). In other words, there are two types of particles A, the particles A1 and particles A2.

It is possible to consistently produce the antiglare film by using a plurality of types of at least one of the particles A or particles B which have different average diameters and/or refractive indexes as exemplified in FIG. 2 because the particles are prevented from clumping together. In particular, it is more preferable to use a plurality of types of particles A than to use those of particles B which have a color compensation function since a degree of freedom for designing the antiglare layer increases.

In such a case, it is necessary for the antiglare film of the present invention to satisfy a condition that both $|n_{A1}-n_M|$ (i.e. a difference in refractive index between the particles A1 and the binder matrix) and $|n_{A2}-n_M|$ (i.e. a difference in refractive index between the particles A2 and the binder matrix) are 0.06 or less. If at least one of the $|n_{A1}-n_M|$ (i.e. a difference in refractive index between the particles A1 and the binder matrix) or $|n_{A2}-n_M|$ (i.e. a difference in refractive index between the particles A2 and the binder matrix) exceeds 0.060, the antiglare layer becomes whitely clouded and unsuitable for an application on a surface of an LCD since light incident on the antiglare layer is scattered by both the particles A and particles B.

In addition, it is preferred that a value $(|n_{A1}-n_M|w_{A1}+|n_{A2}-n_M|w_{A2}+|n_B-n_M|w_B)H$, which is a product obtained by multiplying H, an average thickness of the antiglare layer by a sum of $|n_{A1}-n_M|w_{A1}$, a product of multiplication of a difference in refractive index between the particles A1 and the binder matrix by the content (unit: part by weight) of the particles A1 in the antiglare layer as against 100 parts by weight of the binder matrix, $|n_{A2}-n_M|w_{A2}$, a product of multiplication of a difference in refractive index between the particles A2 and the binder matrix by the content (unit: part by weight) of the particles A2 in the antiglare layer as against 100 parts by weight of the binder matrix, and $|n_B-n_M|w_B$, a product of multiplication of a difference in refractive index between the particles B and the binder matrix by the content (unit: part by weight) of the particles B in the antiglare layer as against 100 parts by weight of the binder matrix, should be in the 2.0-30.0 range. That is, if the value $(|n_{A1}-n_M|w_{A1}+|n_{A2}-n_M|w_{A2}+|n_B-n_M|w_B)H$ is more than 30.0, the antiglare film may become whitely clouded and unsuitable for an application on a surface of an LCD. Meanwhile, if the value $(|n_{A1}-n_M|w_{A1}+|n_{A2}-n_M|w_{A2}+|n_B-n_M|w_B)H$ is less than 2.0, a glare phenomenon is sometimes observed on a displayed image when the antiglare layer is applied on a front surface of an LCD.

Moreover, it is preferred that $w_{A1}+w_{A2}+w_B$, a sum of a content of the particles A1 and the particles A2 in the antiglare layer ($w_{A1}$ (part by weight), $w_{A2}$ (part by weight)) as against 100 parts by weight of binder matrix and a content of the particles B in the antiglare layer ($w_B$ (part by weight)) as against 100 parts by weight of binder matrix, is in the 5-40 parts by weight range. If the $w_{A1}+w_{A2}+w_B$ is less than 5 parts by weight, a sufficient concave-convex structure for scattering external light cannot sometimes be produced on a surface of the antiglare layer because of the lack of particles per volume. Meanwhile, If the value $w_A+w_B$, the sum of the content of the particles A1, particles A2 and particles B, exceeds 40 parts by weight, there are so many particles per volume that these particles show a tendency to be agglutinated and a phenomenon of white blurring may occur on an LCD surface when external light such as fluorescent light falls on the antiglare surface because an excessive concave-convex structure is formed on the antiglare layer. In addition, an excessive concave-convex structure is easily damaged on the convex part thereof when rubbed. Thus, the abrasion resistance of the antiglare film tends to decrease.

In addition, when the particles A have two types of particles A1 and particles A2, and if the particles A1 have a larger average diameter than the particles A2, it is preferred that $r_{A1}/H$, a quotient value of an average diameter of the particles A1 ($r_{A1}$) by an average thickness of the antiglare layer (H), is in the 0.20-0.80 range. The average diameter of the particles A1 ($r_{A1}$) in this range makes it possible to efficiently form the concave-convex structure on the antiglare layer surface. If the $r_{A1}/H$ is less than 0.20, it is sometimes difficult to form the concave-convex structure on the antiglare layer. Meanwhile, if the $r_{A1}/H$ is more than 0.80, a large convex part may be produced on the antiglare layer surface resulting in an excessive concave-convex structure whereby the white blurring phenomenon occurs when external light such as fluorescent light falls on the surface of the antiglare layer. In addition, the large convex part and the excessive concave-convex structure on the antiglare layer may cause a decrease in abrasion resistance of the antiglare film.

Moreover, when the particles A have two types of particles A1 and particles A2, and if the average diameter of the particles A1 ($r_{A1}$) is larger than those of the particles A2 ($r_{A2}$), it is preferable that $r_{A2}/r_{A1}$ is in the 0.2-0.6 range and $w_{A2}/w_{A1}$, a quotient of a division of the content of the particles A2 in the antiglare layer ($w_{A2}$) as against 100 parts by weight of binder matrix by the content of the particles A1 in the antiglare layer ($w_{A1}$) as against 100 parts by weight of binder matrix, is in the 0.5-2.0 range.

It is possible to efficiently form a concave-convex structure on the antiglare layer surface by using two types of particles A such as the particles A1 and particles A2 wherein the $r_{A2}/r_{A1}$ is in the 0.2-0.6 range and $w_{A2}/w_{A1}$ is in the 0.5-1.5 range for the purpose of arranging a particle A2 between any two adjacent particles A1 and preventing the particles A1, which have a larger average diameter, from excessively agglutinating.

If the $r_{A2}/r_{A1}$ is less than 0.2, it is impossible to prevent the particles A1 from agglutinating by the particles A2 and the particles A1 produce an excessive concave-convex structure on the antiglare layer surface resulting in a tendency of an occurrence of white blurring and a decrease in abrasion resistance. Meanwhile, if the $r_{A2}/r_{A1}$ is more than 0.6, it may also be impossible to prevent the particles A1 from agglutinating since the particles A2 fail to sufficiently slip into the particles A1. Then, the particles A1 produce an excessive concave-convex structure on the antiglare layer surface resulting in a tendency of an occurrence of white blurring and a decrease in abrasion resistance.

In addition, the $w_{A2}/w_{A1}$ is less than 0.5, it is impossible to prevent the particles A1 from agglutinating by the particles A2 and the particles A1 produce an excessive concave-convex structure on the antiglare layer surface resulting in a tendency of an occurrence of white blurring and a decrease in abrasion resistance. If the $w_{A2}/w_{A1}$ is more than 0.5, the particles A2 clump together and produce an excessive concave-convex structure on the antiglare layer surface resulting in a tendency of an occurrence of white blurring and a decrease in abrasion resistance.

Furthermore, in accordance with the present invention, it is preferred that the antiglare layer has an average thickness (H) in the range of 3-30 μm. If the average thickness of the antiglare layer is less than 3 μm, the antiglare film sometimes lacks sufficient hardness for an application on a display surface. Meanwhile, if the average thickness of the antiglare layer is more than 30 μm, the cost of the antiglare film is too high and may also be unsuitable for a fabrication process of applying on a display surface because of the high degree of curling thereof. It is more preferable that the antiglare layer has an average thickness (H) in the 4-20 μm range.

If necessary, a functional layer having an antireflection property, an antistatic property, an antifouling property, an electromagnetic shielding property, an infrared ray absorption property or an ultraviolet ray absorption property etc. can be arranged within the antiglare film of the present invention. An antireflection layer, an antistatic layer, an antifouling layer, an electromagnetic shielding layer, an infrared ray absorption layer and an ultraviolet ray absorption layer etc. are examples of this functional layer. Each functional layer may have a single layer structure or a multilayer structure. A functional layer may include a plurality of functions still having a single layer structure such as an antifouling antireflection single layer. In addition, a functional layer may be arranged on the antiglare layer, for example, or between the transparent substrate and the antiglare layer. In accordance with the present invention, a primer layer or an adhesive layer etc. can be formed between any adjacent two layers in order to improve adhesiveness therebetween.

Figure 3:
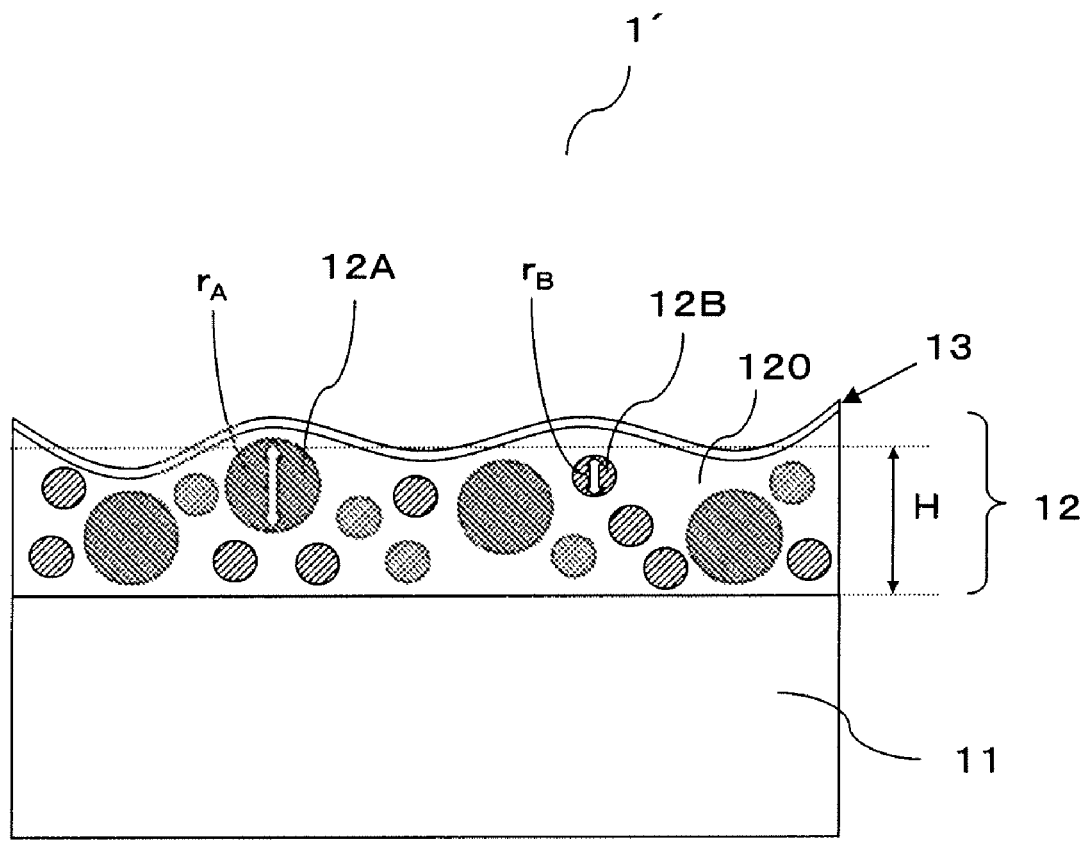
FIG. 3 shows yet another cross-sectional schematic view of an antiglare film in accordance with the present invention.
Figure 4A:
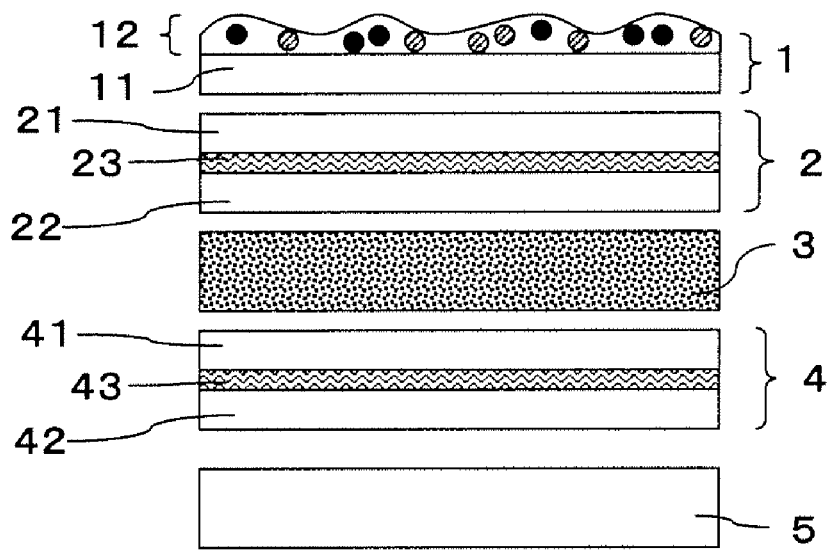
FIGS. 4A and 4B show a transmission type LCD using the antiglare film in accordance with the present invention.
Figure 4B:
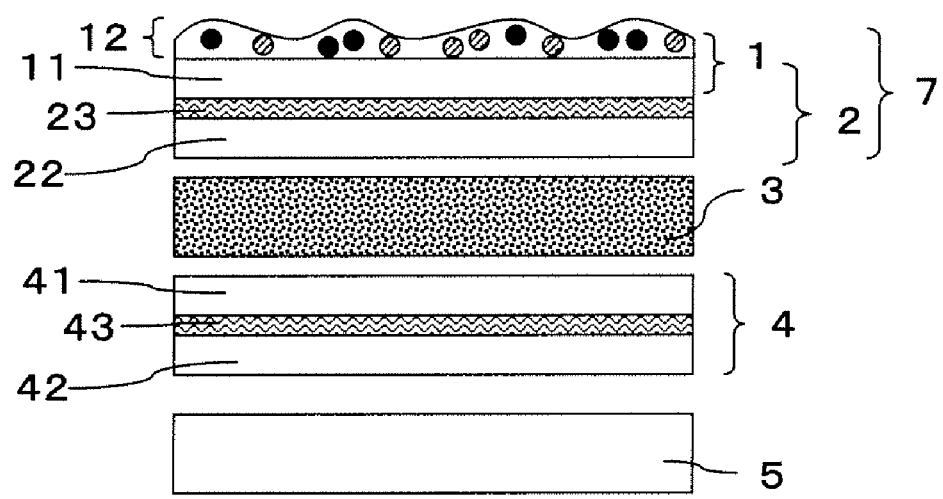

FIG. 3 is an exemplary cross-sectional diagram showing yet another embodiment of the antiglare film of the present invention. The antiglare film (1') in this embodiment of the FIG. 3 has an antiglare layer (12) on a transparent substrate (11) including a functional layer (13) on the antiglare layer (12). An antistatic layer, an antireflection layer or an antistatic layer etc. is selectively formed as a functional layer. Among these, an antireflection layer is preferably formed as a functional layer. It is possible to further weaken the reflection of external light incident on a surface of the antiglare film by placing an antireflection layer on the antiglare layer. When an antireflection layer is formed on the antiglare layer, external light incident on the antiglare film is not only scattered by a concave-convex structure on the antiglare layer but also prevented from reflecting on the film by an interference effect of the antireflection layer FIGS. 4A and 4B show a transmission type LCD which uses the antiglare film of the present invention. The transmission LCD of FIG. 4A includes a back-light unit (5), a first polarizing plate (4), a TN type or VA type of liquid crystal cell (3), a second polarizing plate (2) and the antiglare film (1). At this point, the antiglare film (1) is located on the observer's side, namely, front surface of the LCD.

The back-light unit (5) includes a light source and a light diffusion plate. The liquid crystal cell (3) has electrodes and color filters on a transparent substrate, other electrodes on the other transparent substrate, and liquid crystal between the electrodes on the two transparent substrates. Each of the first and second polarizing plates (4, 2), between which the liquid crystal cell (3) is inserted, has a structure of a polarizing layer (23, 43) being arranged between transparent substrates (21, 22, 41, 42).

FIG. 4A shows a structure in which a transparent substrate of polarizing plate (2) is separately arranged from a transparent substrate (11) of an antiglare film (1). Meanwhile, FIG. 4B shows a structure wherein the polarizing layer (23) is arranged on the opposite side of the transparent substrate (11) from the antiglare layer as if the antiglare film (1) shares substrate (11) with the polarizing plate (2).

In addition, a transmission LCD of the present invention may include other functional components. A diffusion film, which makes it possible to effectively use light from the back-light unit, a prism sheet, a luminance improving film, and a phase difference film, which compensates a phase difference between the liquid crystal cell, and the polarizing plate can be exemplified as these functional components. But the transmission LCD in accordance with the present invention is not limited to these.

Next, a manufacturing method of the antiglare film of the present invention is described.

With the method for manufacturing the antiglare film in accordance with the present invention, an antiglare layer can be formed on the transparent substrate by a process including a step of coating on a transparent substrate a coating liquid for forming an antiglare film that contains at least a binder matrix forming material that is cured by ionizing radiation, particles A, particles B, and a solvent and forming a coating film on the transparent substrate and a step of curing the binder matrix forming material by ionizing radiation.

Glass or a plastic film can be used as the transparent substrate employed in accordance with the present invention. The plastic film may have appropriate transparency and mechanical strength. For example, a film of polyethylene terephthalate (PET), triacetyl cellulose (TAC), diacetyl cellulose, acetyl cellulose butyrate, polyethylene naphthalate (PEN), a cycloolefin polymer, a polyamide, a polyethersulfone (PES), polymethyl methacrylate (PMMA), and a polycarbonate (PC) can be used. Among them, a triacetyl cellulose film can be used advantageously because of small birefringence and good transparency thereof.

Further, as shown in FIG. 4B, a polarizing layer can also be provided on the surface of the transparent substrate located on the opposite side from the surface where the antiglare layer is located. In this case, for example, a stretched film of polyvinyl alcohol (PVA) having iodine added thereto can be used as the polarizing layer. The polarizing layer in this case is sandwiched by the transparent substrates.

The liquid for forming the antiglare layer contains at least a binder matrix forming material that is cured by ionizing radiation, particles A, particles B, and a solvent. In this case, a material curable by ionizing radiation can be used as the binder matrix forming material. It becomes possible to provide a hard coat property sufficient for an application on a surface of an LCD by using a material curable by ionizing radiation. Examples of materials that can be used as materials curable by ionizing radiation include polyfunctional acrylates such as acrylic acid or methacrylic acid esters of polyhydric alcohols, and polyfunctional urethane acrylates synthesized from diisocyanates, polyhydric alcohols, and hydroxy esters of acrylic acid or methacrylic acid. In addition, polyether resins, polyester resins, epoxy resins, alkyd resins, spyroacetal resins, polybutadiene resins, and polythiolpolyene resins having an acrylate functional group can be used as the materials curable by ionizing radiation.

Among them, trifunctional acrylate monomers and tetrafunctional acrylate monomers that are materials curable by ionizing radiation are preferred as the binder matrix forming materials. By using trifunctional acrylate monomers and tetrafunctional acrylate monomers, it is possible to obtain an antiglare film comprising sufficient abrasion resistance. Specific examples of trifunctional acrylate monomers and tetrafunctional acrylate monomers include trifunctional and tetrafunctional compounds from among polyfunctional acrylate monomers such as acrylic acid or methacrylic acid esters of polyhydric alcohols or polyfunctional urethane acrylate monomers synthesized from diisocyanates, polyhydric alcohols, and hydroxy esters of acrylic acid or methacrylic acid. In this case, the trifunctional acrylate monomers and tetrafunctional acrylate monomers are preferably used in a total amount equal to or larger than 80 wt. % based on the binder matrix forming material.

Further, in the binder matrix forming material, a thermoplastic resin can also be added to the material curable by ionizing radiation. Examples of suitable thermoplastic resins include cellulose derivatives such as acetyl cellulose, nitrocellulose, acetylbutyl cellulose, ethyl cellulose, and methyl cellulose, vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resin and copolymers thereof and methacrylic resin and copolymers thereof, polystyrene resin, polyamide resins, linear polyester resins, and polycarbonate resins. By adding a thermoplastic resin, it is possible to improve adhesiveness of the transparent substrate and antiglare layer. Further, by adding a thermoplastic resin, it is possible to inhibit the curling of the produced antiglare film.

Particles A used in accordance with the present invention can be appropriately selected from acrylic particles (refractive index 1.49), polymethyl methacrylate (PMMA) particles (refractive index 1.50), acryl-styrene particles (refractive index 1.49-1.59), polystyrene particles (refractive index 1.59), polycarbonate particles (refractive index 1.58), melamine particles (refractive index 1.66), epoxy particles (refractive index 1.58), polyurethane particles (refractive index 1.55), Nylon particles (refractive index 1.50), polyethylene particles (refractive index 1.50-1.56), polypropylene particles (refractive index 1.49), silicone particles (refractive index 1.43), polytetrafluoroethylene particles (refractive index 1.35), polyvinylidene fluoride particles (refractive index 1.42), polyvinyl chloride particles (refractive index 1.54), and polyvinylidene chloride particles (refractive index 1.62), glass particles (refractive index 1.48), and silica particles (refractive index 1.43). In addition, in accordance with the present invention, particles A may include a plurality of types.

Particles B used in accordance with the present invention can be appropriately selected from polystyrene particles (refractive index 1.59), polycarbonate particles (refractive index 1.58), melamine particles (refractive index 1.66), polyvinylidene chloride particles (refractive index 1.62), silicone particles (refractive index 1.43), polytetrafluoroethylene particles (refractive index 1.35), polyvinylidene fluoride particles (refractive index 1.42), alumina particles (refractive index 1.76), glass particles (refractive index 1.48), and silica particles (refractive index 1.43). In addition, in accordance with the present invention, particles B may include a plurality of types.

When ultraviolet radiation is used as the ionizing radiation, a photopolymerization initiator is added to the coating liquid for forming an antiglare layer. Well known photopolymerization initiators can be used for this purpose, but it is preferred that the photopolymerization initiator contained in the binder matrix forming material be used. Examples of suitable photopolymerization initiators include benzoin and alkyl ethers thereof such as benzoin, benzoin methyl ether, benzoin ethyl ether, benzoin isopropyl ether, and benzyl methyl ketal. The amount of photopolymerization initiator used is 0.5-20 wt. %, preferably 1-5 wt. % based on the binder matrix forming material.

A solvent is added to the coating liquid for forming an antiglare layer. By adding a solvent, it is possible to disperse uniformly the particles and binder matrix and also adjust the viscosity of the coating liquid to an adequate range when the coating liquid is coated on the transparent substrate.

In accordance with the present invention, when triacetyl cellulose is used as the transparent substrate and the antiglare layer is directly provided, without other functional layers, on the triacetyl cellulose film, it is preferred that a mixed solvent be used that includes a solvent that dissolves the triacetyl cellulose film or causes swelling thereof and a solvent that neither dissolves the triacetyl cellulose film nor causes swelling thereof. By using the mixed solvent, it is possible to obtain an antiglare film having sufficient adhesion on the interface of the triacetyl cellulose and antiglare layer.

In this case, examples of solvents that dissolve a triacetyl cellulose film or cause swelling thereof include ethers such as dibutyl ether, dimethoxymethane, dimethoxyethane, diethoxyethane, propylene oxide, dioxane, dioxalan, trioxane, tetrahydrofuran, anisole, and phenetol, partial ketones such as acetone, methyl ethyl ketone, diethyl ketone, dipropyl ketone, diisobutyl ketone, cyclopentanone, cyclohexanone, methyl cyclohexanone, and methyl cyclohexanone, esters such as ethyl formate, propyl formate, n-pentyl formate, methyl acetate, ethyl acetate, methyl propionate, ethyl propionate, n-pentyl acetate, and γ-butyrolactone, and cellosolves such as methyl cellosolve, cellosolve, butyl cellosolve, and cellosolve acetate. These solvents can be used individually or in combinations of two or more thereof.

Examples of solvents that neither dissolve a triacetyl cellulose film nor cause swelling thereof include aromatic hydrocarbons such as toluene, xylene, cyclohexanone, and cyclohexylbenzene, hydrocarbons such as n-hexane, and partial ketones such as methyl isobutyl ketone and methyl butyl ketone. These solvents can be used individually or in combinations of two or more thereof.

In accordance with the present invention, an additive that is called a surface adjusting agent may be added to prevent the occurrence of coating defects such as repelling and unevenness in the antiglare layer (coating film) that is formed by coating the coating liquid for forming an antiglare layer. Depending on the action thereof, the surface adjusting agent is also called a leveling agent, an antifoaming agent, an interface tension adjusting agent, and a surface tension adjusting agent, but all these agents act to decrease the surface tension of the coating film (antiglare layer).

Examples of additives that are usually used as the surface adjusting agent include silicone-based additive, fluorine-containing additive, and acrylic additives. Examples of suitable silicone-based additives include derivatives having polydimethylsiloxane as the basic structure in which a side chain of the polydimethylsiloxane structure is modified. For example, a polyether-modified dimethyl siloxane can be used as the silicone additive. Compounds having a perfluoroalkyl group are used as fluorine-containing additives.

In addition to the above-described surface adjusting agent, other additives may also be added to the coating liquid for forming an antiglare layer in accordance with the present invention. However, it is preferred that these additives produce no adverse effect on transparency and light diffusing ability of the antiglare layer that is formed. Examples of functional additives include an antistatic agent, an ultraviolet absorbing agent, an infrared absorbing agent, an antifouling agent, a water repellent, a refractive index adjusting agent, an adhesiveness increasing agent, and a curing agent. As a result, functions other than the antiglare function, such as an antistatic function, an ultraviolet absorption function, an infrared absorption function, an antifouling function, and a water repellent function can be imparted to the antiglare layer formed.

The coating liquid for forming an antiglare layer is coated on the transparent substrate to form a coating film.

A coating method using a roll coater, a reverse roll coater, a gravure coater, a knife coater, a bar coater, or a die coater can be used as a method for coating the coating liquid for forming an antiglare layer on the transparent substrate. Among these coaters, a die coater suitable for high-speed coating based on a roll-to-roll system is preferably used. The concentration of solids in the coating liquid differs depending on the coating method. The concentration of solids generally may be 30-70 wt. %.

Figure 5:
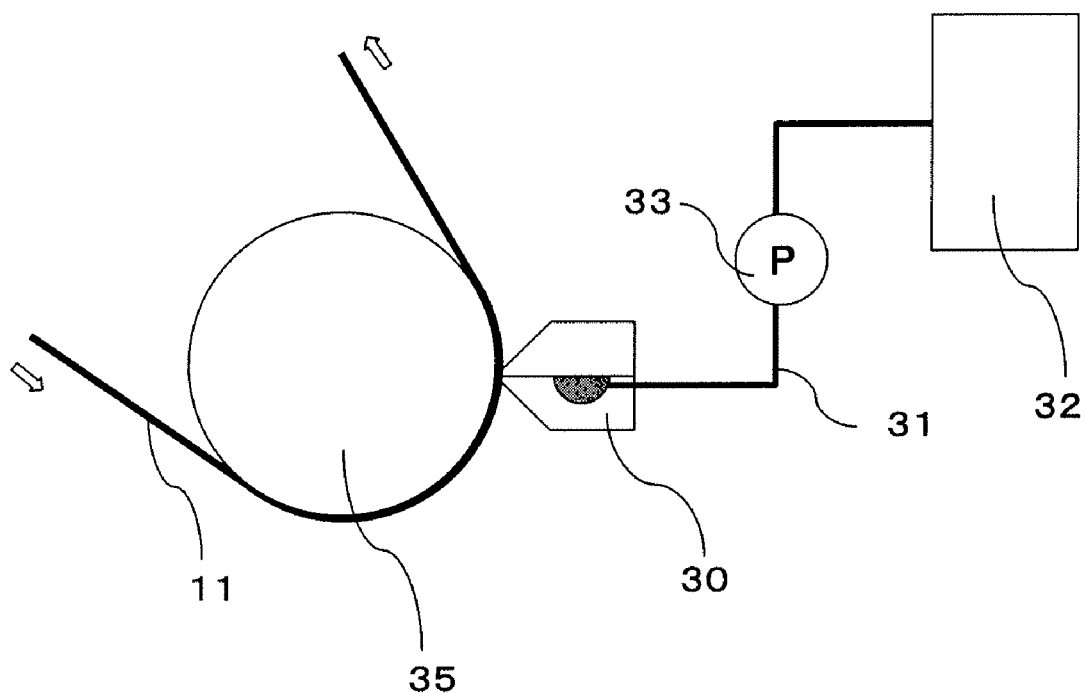
FIG. 5 is a schematic drawing of a coating apparatus using a die coater in accordance with the present invention.

Next, a coating apparatus using a die coater in accordance with the present invention will be described below. FIG. 5 is a schematic drawing of a coating apparatus using a die coater in accordance with the present invention. The apparatus using a die coater in accordance with the present invention has a structure in which a die head 30 is connected by a pipe 31 to a coating liquid tank 32, and the coating liquid for forming an antiglare layer that is located in the coating liquid tank 32 is pumped by a liquid pump 33 into the die head 30. The coating liquid that has been pumped into the die head 30 is ejected from a slit gap, and a coating film is formed on a transparent substrate 11. By using a wound transparent substrate 11 and a rotary roller 35, it is possible to form a coating film continuously on the transparent substrate by a roll-to-roll system.

After a step of forming the coating film, a drying process to remove the solvent which remains in the coating film is implemented. Examples of suitable drying means include heating, air blowing, and hot air blowing. In addition, it may also be possible to remove the solvent by drying naturally.

An antiglare layer is formed by irradiating the coating film obtained by coating the coating liquid for forming an antiglare layer on the transparent substrate with ionizing radiation. Ultraviolet radiation or an electron beam can be used as the ionizing radiation. When ultraviolet curing is employed, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used. The electron beam preferably has energy of 50-1000 KeV. An electron beam having energy of 100-300 KeV is more preferred.

The antiglare film in accordance with the present invention is manufactured in the above-described manner.

A method for forming an antireflection layer in the antiglare film by which the antireflection layer such as shown in FIG. 2 is provided as a functional layer on the antiglare layer will be described below. The antireflection layer can have a monolayer structure composed of a single layer with a low refractive index or a multilayer structure composed of a repetitive structure of layers with a low refractive index and layers with a high refractive index. Methods for forming an antireflection layer can be classified into methods based on a wet film forming process in which a coating liquid for forming an antireflection layer is coated on the antiglare layer surface and methods by which the coating film is formed under vacuum, such as a vacuum vapor deposition method, a sputtering method, and a CVD method.

In a method by which a single layer with a low refractive index is formed as an antireflection layer by a wet film forming method by coating a coating liquid for forming an antireflection layer on the antiglare layer surface, a coating liquid which contains binder matrix forming material and low-refractive particles can be used as a coating liquid for forming a low refractive index layer. Then, a low refractive index single layer wherein low-refractive particles are dispersed in the binder matrix can be formed. The thickness (d) of a single layer with a low refractive index that is the antireflection layer is designed so that an optical thickness (nd) of the film obtained by multiplying the film thickness (d) by a refractive index (n) of the layer with a low refractive index be equal to ¼ the visible light wavelength.

The antireflection layer can have a stacked layer structure with an iteration structure of a low refractive index layer and a high refractive index layer. For example, the antireflection layer can take a four-layer structure in which a titanium oxide as a high refractive index layer, a silicon oxide as a low refractive index layer, another titanium oxide as a high refractive index layer, and another silicon oxide as a low refractive index layer are formed in sequence from the antiglare layer side by means of a deposition method such as vacuum vapor deposition method or sputtering method.

In addition, in the case where an antistatic layer is arranged as a functional layer, a producing method of forming a conductive material such as a metal or a metal oxide etc. by a vacuum deposition, or a producing method of coating a coating liquid in which a conductive material such as a metal or a metal oxide etc. is dispersed with the binder matrix material can be used.

The constitution of the invention described above makes it possible to provide an antiglare film not only with an antiglare function, which prevents external light falling on a surface when the antiglare film is placed on the surface of an TN type or VA type of LCD, but also with a color compensation function, which prevents gray scale inversion and compensates a color change which is perceived when being observed in an oblique direction.

EXAMPLES

Examples are described below.

Example 1-18, Comparative Example 1-6

A triacetyl cellulose film (TD-80U, manufactured by Fuji Photo Film Co., Ltd.) was used as a transparent substrate. The coating liquid for forming an antiglare layer which consisted of a binder matrix forming material, particles A, particles B, and a solvent shown in Table 1 and Table 2 was used as a coating liquid. Although each of materials, refractive indexes, average diameters, and parts by weight of the particles A and the particles B varied, the binder matrix forming material and the solvent were common to all of the Examples 1-18 and Comparative Examples 1-6.

TABLE 1

| Binder matrix forming material | Ionizing radiation curable material | Pentaerythritol triacrylate (by KYOEISHA CHEMICAL) | 94.5 pbw (parts by weight) | Refractive Index $n_M$: 1.525 |
|---|---|---|---|---|
| | Photopolymerization initiator | Irgacure184 (by Ciba Specialty Chemicals) | 5.0 pbw | |
| | Acrylic additive | BYK-350 (by BYK-Chemie Japan) | 0.5 pbw | |
| | Solvent | Dioxolan | 30.0 pbw | |
| | | Toluene | 70.0 pbw | |

TABLE 2

| | Particles A | | | | Particles B | | | |
|---|---|---|---|---|---|---|---|---|
| | Type of material | Refractive index $n_A$ | Average diameter $r_A$ (μm) | Part by weight $w_A$ (μm) | Type of material | Refractive index $n_B$ | Average diameter $r_B$ (μm) | Part by weight $w_B$ (μm) |
| Example 1 | PMMA, Styrene | 1.555 | 8.0 | 18.0 | Silicone | 1.430 | 3.5 | 8.0 |
| Example 2 | PMMA, Styrene | 1.580 | 8.0 | 8.0 | Silicone | 1.430 | 3.5 | 3.0 |
| Comparative example 1 | Styrene | 1.590 | 3.5 | 8.0 | Silicone | 1.430 | 3.5 | 3.0 |
| Example 3 | PMMA | 1.495 | 8.0 | 24.0 | Alumina | 1.760 | 2.0 | 4.0 |
| Comparative example 2 | PMMA | 1.495 | 8.0 | 24.0 | Zn oxide | 1.950 | 2.0 | 3.0 |
| Example 4 | PMMA, Styrene | 1.555 | 8.0 | 24.0 | Silicone | 1.430 | 4.5 | 2.0 |
| Comparative example 3 | PMMA, Styrene | 1.555 | 8.0 | 24.0 | Silicone | 1.430 | 6.0 | 2.0 |

TABLE 2-continued

|  | Particles A | | | | Particles B | | | |
| --- | --- | --- | --- | --- | --- | --- | --- | --- |
|  | Type of material | Refractive index $n_A$ | Average diameter $r_A$ (μm) | Part by weight $w_A$ (μm) | Type of material | Refractive index $n_B$ | Average diameter $r_B$ (μm) | Part by weight $w_B$ (μm) |
| Example 5 | PMMA, Styrene | 1.555 | 8.0 | 18.0 | Silicone | 1.430 | 0.5 | 4.0 |
| Comparative example 4 | PMMA, Styrene | 1.555 | 8.0 | 18.0 | Silicone | 1.430 | 0.3 | 4.0 |
| Example 6 | PMMA | 1.495 | 8.0 | 15.0 | Alumina | 1.760 | 3.5 | 4.0 |
| Comparative example 5 | PMMA | 1.495 | 8.0 | 15.0 | Alumina | 1.760 | 3.5 | 5.0 |
| Example 7 | PMMA | 1.495 | 5.0 | 8.0 | Alumina | 1.760 | 5.0 | 2.0 |
| Comparative example 6 | PMMA | 1.495 | 5.0 | 8.0 | Silicone | 1.430 | 5.0 | 2.0 |
| Example 8 | PMMA | 1.495 | 8.0 | 24.0 | Alumina | 1.760 | 2.0 | 4.0 |
| Example 9 | PMMA, Styrene | 1.575 | 8.0 | 22.0 | Alumina | 1.760 | 2.0 | 4.0 |
| Example 10 | PMMA, Styrene | 1.515 | 7.0 | 12.0 | Silicone | 1.430 | 0.5 | 2.0 |
| Example 11 | PMMA, Styrene | 1.525 | 7.0 | 12.0 | Silicone | 1.430 | 0.5 | 2.0 |
| Example 12 | PMMA, Styrene | 1.535 | 8.0 | 25.0 | Silicone | 1.430 | 5.0 | 12.0 |
| Example 13 | PMMA, Styrene | 1.535 | 8.0 | 30.0 | Silicone | 1.430 | 5.0 | 12.0 |
| Example 14 | PMMA, Styrene | 1.555 | 8.0 | 3.0 | Silicone | 1.430 | 0.5 | 2.0 |
| Example 15 | PMMA, Styrene | 1.555 | 8.0 | 2.0 | Silicone | 1.430 | 0.5 | 2.0 |
| Example 16 | PMMA, Styrene | 1.555 | 3.5 | 18.0 | Silicone | 1.430 | 2.0 | 8.0 |
| Example 17 | PMMA, Styrene | 1.555 | 2.5 | 18.0 | Silicone | 1.430 | 2.0 | 8.0 |
| Example 18 | PMMA, Styrene | 1.555 | 10.0 | 18.0 | Silicone | 1.430 | 2.0 | 8.0 |

The coating liquid was coated on a triacetyl cellulose film by using a coating apparatus employing a die coater to obtain a coating film. The coating film was dried to remove a solvent therein. Then, the coating film was exposed to ultraviolet ray at 400 mJ/cm² with a high pressure mercury lamp to cure under an atmosphere of 0.03% or less of oxygen concentration so that an antiglare film including an antiglare layer on a transparent substrate was produced.

The average particle sizes of the particles A and particles B were measured with a light scattering particle size distribution analyzer (SALD-7000, manufactured by Shimadzu Corporation). In addition, refractive indexes of the particles A and particles B were measured by means of Becke line detection method or immersion method. Refractive index of the binder matrix ($n_M$) was measured by Becke line detection method or immersion method using a binder matrix material which was free from the particles A and particles B and was coated, dried and cured by ultraviolet irradiation. The H (μm), the average thickness of the antiglare layer was measured with an electronic micrometer (K351C, manufactured by Anritsu Corp.).

Table 3 shows H (the average thickness of the antiglare layer), $|n_A-n_M|$, $|n_B-n_M|$, $r_B$ (the average diameter of the particles B), $|n_B-n_M|w_B H$, $(|n_A-n_M|w_A+|n_B-n_M|w_B)H$, $w_A+w_B$, and $r_A/H$ in the Examples 1-18 and Comparative Examples 1-6.

TABLE 3

|  | H: Average thickness of the antiglare layer (μm) | $\|n_A - n_M\|$ | $\|n_B - n_M\|$ | $r_B$ (μm) | $\|n_B - n_M\|w_B H$ | $(\|n_A - n_M\|w_A + \|n_B - n_M\|w_B)H$ | $w_A + w_B$ | $r_A/H$ |
| --- | --- | --- | --- | --- | --- | --- | --- | --- |
| Example 1 | 16.0 | 0.030 | 0.095 | 3.5 | 12.2 | 20.8 | 26.0 | 0.50 |
| Example 2 | 10.0 | 0.055 | 0.095 | 3.5 | 2.9 | 7.3 | 11.0 | 0.80 |
| Comparative example 1 | 10.0 | 0.065 | 0.095 | 3.5 | 2.9 | 8.1 | 11.0 | 0.35 |
| Example 3 | 9.0 | 0.030 | 0.235 | 2.0 | 8.5 | 14.9 | 28.0 | 0.89 |
| Comparative example 2 | 9.0 | 0.030 | 0.425 | 2.0 | 11.5 | 18.0 | 27.0 | 0.89 |
| Example 4 | 10.0 | 0.030 | 0.095 | 4.5 | 1.9 | 9.1 | 26.0 | 0.80 |
| Comparative example 3 | 10.0 | 0.030 | 0.095 | 6.0 | 1.9 | 9.1 | 26.0 | 0.80 |
| Example 5 | 12.0 | 0.030 | 0.095 | 0.5 | 4.6 | 11.0 | 22.0 | 0.67 |
| Comparative example 4 | 12.0 | 0.030 | 0.095 | 0.3 | 4.6 | 11.0 | 22.0 | 0.67 |
| Example 6 | 15.0 | 0.030 | 0.235 | 3.5 | 14.1 | 20.9 | 19.0 | 0.53 |
| Comparative example 5 | 17.0 | 0.030 | 0.235 | 3.5 | 20.0 | 27.6 | 20.0 | 0.47 |

TABLE 3-continued

|  | H: Average thickness of the antiglare layer (μm) | $\|n_A - n_M\|$ | $\|n_B - n_M\|$ | $r_B$ (μm) | $\|n_B - n_M\|w_B H$ | $(\|n_A - n_M\|w_A + \|n_B - n_M\|w_B)H$ | $w_A + w_B$ | $r_A/H$ |
|---|---|---|---|---|---|---|---|---|
| Example 7 | 7.0 | 0.030 | 0.235 | 5.0 | 3.3 | 5.0 | 10.0 | 0.71 |
| Comparative example 6 | 7.0 | 0.030 | 0.095 | 5.0 | 1.3 | 3.0 | 10.0 | 0.71 |
| Example 8 | 15.0 | 0.030 | 0.235 | 2.0 | 14.1 | 24.9 | 28.0 | 0.53 |
| Example 9 | 15.0 | 0.050 | 0.235 | 2.0 | 14.1 | 30.6 | 26.0 | 0.53 |
| Example 10 | 8.0 | 0.010 | 0.095 | 0.5 | 1.5 | 2.5 | 14.0 | 0.88 |
| Example 11 | 8.0 | 0.000 | 0.095 | 0.5 | 1.5 | 1.5 | 14.0 | 0.88 |
| Example 12 | 9.0 | 0.010 | 0.095 | 5.0 | 10.3 | 12.5 | 37.0 | 0.89 |
| Example 13 | 9.0 | 0.010 | 0.095 | 5.0 | 10.3 | 13.0 | 42.0 | 0.89 |
| Example 14 | 10.0 | 0.030 | 0.095 | 0.5 | 1.9 | 2.8 | 5.0 | 0.80 |
| Example 15 | 10.0 | 0.030 | 0.095 | 0.5 | 1.9 | 2.5 | 4.0 | 0.80 |
| Example 16 | 16.0 | 0.030 | 0.095 | 2.0 | 12.2 | 20.8 | 26.0 | 0.22 |
| Example 17 | 16.0 | 0.030 | 0.095 | 2.0 | 12.2 | 20.8 | 26.0 | 0.16 |
| Example 18 | 10.0 | 0.030 | 0.095 | 2.0 | 7.6 | 13.0 | 26.0 | 1.00 |

Example 19-36, Comparative Example 7-12

A triacetyl cellulose film (TD-80U, manufactured by Fuji Photo Film Co., Ltd.) was used as a transparent substrate. The coating liquid for forming an antiglare layer which consisted of a binder matrix forming material, particles A1, particles A2, particles B, and a solvent shown in Table 4 and Table 5A and B was used as a coating liquid. Although each of materials, refractive indexes, average diameters, and parts by weight of the particles A and the particles B varied, the binder matrix forming material and the solvent were common to all of the Examples 19-36 and Comparative Examples 7-12. The particles A1 and A2 were determined in a way that the particle A1 had the larger average diameter.

TABLE 4

| Binder matrix forming material | Ionizing radiation curable material | Pentaerythritol triacrylate (by KYOEISHA CHEMICAL) | 94.5 pbw (parts by weight) | Refractive Index $n_M$: 1.525 |
|---|---|---|---|---|
| | Photopolymerization initiator | Irgacure184 (by Ciba Specialty Chemicals) | 5.0 pbw | |
| | Acrylic additive | BYK-350 (by BYK-Chemie Japan) | 0.5 pbw | |
| | Solvent | Dioxolan | 30.0 pbw | |
| | | Toluene | 70.0 pbw | |

TABLE 5A

|  |  | Particles A1 | | | | Particles A2 | | |
|---|---|---|---|---|---|---|---|---|
|  | Type of material | Refractive index $n_{A1}$ | Average diameter $r_{A1}$ (μm) | Part by weight $w_{A1}$ (μm) | Type of material | Refractive index $n_{A2}$ | Average diameter $r_{A2}$ (μm) | Part by weight $w_{A2}$ (μm) |
| Example 19 | PMMA | 1.495 | 8.0 | 9.0 | PMMA | 1.495 | 3.0 | 9.0 |
| Example 20 | PMMA, Styrene | 1.580 | 8.0 | 4.0 | PMMA | 1.495 | 3.0 | 4.0 |
| Comparative example 7 | Styrene | 1.590 | 3.5 | 4.0 | PMMA | 1.495 | 3.0 | 4.0 |
| Example 21 | PMMA | 1.495 | 8.0 | 12.0 | PMMA | 1.495 | 3.0 | 12.0 |
| Comparative example 8 | PMMA | 1.495 | 8.0 | 12.0 | PMMA | 1.495 | 3.0 | 12.0 |
| Example 22 | PMMA, Styrene | 1.555 | 8.0 | 12.0 | PMMA | 1.495 | 3.0 | 12.0 |
| Comparative example 9 | PMMA, Styrene | 1.555 | 8.0 | 12.0 | PMMA | 1.495 | 3.0 | 12.0 |
| Example 23 | PMMA, Styrene | 1.555 | 8.0 | 9.0 | PMMA | 1.495 | 3.0 | 9.0 |
| Comparative example 10 | PMMA, Styrene | 1.555 | 8.0 | 9.0 | PMMA | 1.495 | 3.0 | 9.0 |
| Example 24 | PMMA | 1.495 | 8.0 | 7.5 | PMMA | 1.495 | 3.0 | 7.5 |
| Comparative example 11 | PMMA | 1.495 | 8.0 | 7.5 | PMMA | 1.495 | 3.0 | 7.5 |
| Example 25 | PMMA | 1.495 | 5.0 | 4.0 | PMMA | 1.495 | 3.0 | 4.0 |
| Comparative example 12 | PMMA | 1.495 | 5.0 | 4.0 | PMMA | 1.495 | 3.0 | 4.0 |
| Example 26 | PMMA | 1.495 | 8.0 | 12.0 | PMMA | 1.495 | 3.0 | 12.0 |
| Example 27 | PMMA, Styrene | 1.575 | 8.0 | 15.0 | PMMA | 1.575 | 3.0 | 15.0 |
| Example 28 | PMMA, Styrene | 1.515 | 7.0 | 6.0 | PMMA | 1.495 | 3.0 | 6.0 |

TABLE 5A-continued

| | Particles A1 | | | | Particles A2 | | | |
|---|---|---|---|---|---|---|---|---|
| | Type of material | Refractive index $n_{A1}$ | Average diameter $r_{A1}$ (μm) | Part by weight $w_{A1}$ (μm) | Type of material | Refractive index $n_{A2}$ | Average diameter $r_{A2}$ (μm) | Part by weight $w_{A2}$ (μm) |
| Example 29 | PMMA, Styrene | 1.525 | 7.0 | 6.0 | PMMA | 1.525 | 3.0 | 6.0 |
| Example 30 | PMMA, Styrene | 1.535 | 8.0 | 15.0 | PMMA | 1.535 | 3.0 | 12.0 |
| Example 31 | PMMA, Styrene | 1.535 | 8.0 | 15.0 | PMMA | 1.495 | 3.0 | 15.0 |
| Example 32 | PMMA, Styrene | 1.555 | 8.0 | 1.5 | PMMA | 1.495 | 3.0 | 1.5 |
| Example 33 | PMMA, Styrene | 1.555 | 8.0 | 1.0 | PMMA | 1.495 | 3.0 | 1.0 |
| Example 34 | PMMA, Styrene | 1.555 | 3.5 | 9.0 | PMMA | 1.495 | 3.0 | 9.0 |
| Example 35 | PMMA | 1.495 | 3.0 | 9.0 | PMMA, Styrene | 1.555 | 2.5 | 9.0 |
| Example 36 | PMMA, Styrene | 1.555 | 10.0 | 9.0 | PMMA, Styrene | 1.555 | 3.0 | 9.0 |

TABLE 5B

| | Particles B | | | |
|---|---|---|---|---|
| | Type of material | Refractive index $n_B$ | Average diameter $r_B$ (μm) | Part by weight $w_B$ (μm) |
| Example 19 | Silicone | 1.430 | 3.5 | 8.0 |
| Example 20 | Silicone | 1.430 | 3.5 | 8.0 |
| Comparative example 7 | Silicone | 1.430 | 3.5 | 3.0 |
| Example 21 | Alumina | 1.760 | 2.0 | 4.0 |
| Comparative example 8 | Zinc oxide | 1.950 | 2.0 | 3.0 |
| Example 22 | Silicone | 1.430 | 4.5 | 2.0 |
| Comparative example 9 | Silicone | 1.430 | 6.0 | 2.0 |
| Example 23 | Silicone | 1.430 | 0.5 | 4.0 |
| Comparative example 10 | Silicone | 1.430 | 0.3 | 4.0 |
| Example 24 | Alumina | 1.760 | 3.5 | 4.0 |
| Comparative example 11 | Alumina | 1.760 | 3.5 | 5.0 |
| Example 25 | Alumina | 1.760 | 5.0 | 2.0 |
| Comparative example 12 | Silicone | 1.430 | 5.0 | 2.0 |
| Example 26 | Alumina | 1.760 | 2.0 | 4.0 |
| Example 27 | Alumina | 1.760 | 2.0 | 4.0 |
| Example 28 | Silicone | 1.430 | 0.5 | 2.0 |
| Example 29 | Silicone | 1.430 | 0.5 | 2.0 |
| Example 30 | Silicone | 1.430 | 5.0 | 12.0 |
| Example 31 | Silicone | 1.430 | 5.0 | 12.0 |
| Example 32 | Silicone | 1.430 | 0.5 | 2.0 |
| Example 33 | Silicone | 1.430 | 0.5 | 2.0 |
| Example 34 | Silicone | 1.430 | 2.0 | 8.0 |
| Example 35 | Silicone | 1.430 | 2.0 | 8.0 |
| Example 36 | Silicone | 1.430 | 2.0 | 8.0 |

The coating liquid was coated on a triacetyl cellulose film by using a coating apparatus employing a die coater to obtain a coating film. The coating film was dried to remove a solvent therein. Then, the coating film was exposed to ultraviolet ray at 400 mJ/cm² with a high pressure mercury lamp to cure under an atmosphere of 0.03% or less of oxygen concentration so that an antiglare film including an antiglare layer on a transparent substrate was produced.

The average particle sizes of the particles A1, particles A2 and particles B were measured with a light scattering particle size distribution analyzer (SALD-7000, manufactured by Shimadzu Corporation). In addition, refractive indexes of the particles A1, particles A2 and particles B were measured by means of Becke line detection method or immersion method. Refractive index of the binder matrix ($n_M$) was measured by Becke line detection method or immersion method using a binder matrix material which was free from the particles A1, particles A2 and particles B and was coated, dried and cured by ultraviolet irradiation. The H (μm), the average thickness of the antiglare layer was measured with an electronic micrometer (K351C, manufactured by Anritsu Corp.).

Table 6 shows H (i.e. the average thickness of the antiglare layer), $n_{A1}-n_M$, $|n_{A2}-n_M|$, $|n_B-n_M|$, $r_B$ (i.e. the average diameter of the particles B), $|n_B-n_M|w_BH$, $(|n_{A1}-n_M|w_{A1}+|n_{A2}-n_M|w_{A2}+|n_B-n_M|w_B)H$, $w_{A1}+w_{A2}+w_B$, and $r_{A1}/H$ in the Examples 19-36 and Comparative Examples 7-12.

TABLE 6

| | H (μm) | $|n_{A1} - n_M|$ | $|n_{A2} - n_M|$ | $|n_B - n_M|$ | $r_B$ (μm) | $(|n_B - n_M| w_B H)$ | $(|n_{A1} - n_M|w_{A1} + |n_{A2} - n_M|w_{A2} + |n_B - n_M|w_B)H$ | $w_{A1} + w_{A2} + w_B$ | $r_A/H$ |
|---|---|---|---|---|---|---|---|---|---|
| Example 19 | 16.0 | 0.030 | 0.030 | 0.095 | 3.5 | 12.2 | 20.8 | 26.0 | 0.50 |
| Example 20 | 16.0 | 0.055 | 0.030 | 0.095 | 3.5 | 12.2 | 17.6 | 16.0 | 0.50 |
| Comparative example 7 | 10.0 | 0.065 | 0.030 | 0.095 | 3.5 | 2.9 | 6.7 | 11.0 | 0.35 |
| Example 21 | 9.0 | 0.030 | 0.030 | 0.235 | 2.0 | 8.5 | 14.9 | 28.0 | 0.89 |
| Comparative example 8 | 9.0 | 0.030 | 0.030 | 0.425 | 2.0 | 11.5 | 18.0 | 27.0 | 0.89 |
| Example 22 | 10.0 | 0.030 | 0.030 | 0.095 | 4.5 | 1.9 | 9.1 | 26.0 | 0.80 |
| Comparative example 9 | 10.0 | 0.030 | 0.030 | 0.095 | 6.0 | 1.9 | 9.1 | 26.0 | 0.80 |
| Example 23 | 12.0 | 0.030 | 0.030 | 0.095 | 0.5 | 4.6 | 11.0 | 22.0 | 0.67 |
| Comparative example 10 | 12.0 | 0.030 | 0.030 | 0.095 | 0.3 | 4.6 | 11.0 | 22.0 | 0.67 |

TABLE 6-continued

| | H (μm) | $|n_{A1} - n_M|$ | $|n_{A2} - n_M|$ | $|n_B - n_M|$ | $r_B$ (μm) | $(|n_B - n_M| w_B H)$ | $(|n_{A1} - n_M|w_{A1} + |n_{A2} - n_M|w_{A2} + |n_B - n_M|w_B)H$ | $w_{A1} + w_{A2} + w_B$ | $r_A/H$ |
|---|---|---|---|---|---|---|---|---|---|
| Example 24 | 15.0 | 0.030 | 0.030 | 0.235 | 3.5 | 14.1 | 20.9 | 19.0 | 0.53 |
| Comparative example 11 | 17.0 | 0.030 | 0.030 | 0.235 | 3.5 | 20.0 | 27.6 | 20.0 | 0.47 |
| Example 25 | 7.0 | 0.030 | 0.030 | 0.235 | 5.0 | 3.3 | 5.0 | 10.0 | 0.71 |
| Comparative example 12 | 7.0 | 0.030 | 0.030 | 0.095 | 5.0 | 1.3 | 3.0 | 10.0 | 0.71 |
| Example 26 | 15.0 | 0.030 | 0.030 | 0.235 | 2.0 | 14.1 | 24.9 | 28.0 | 0.53 |
| Example 27 | 15.0 | 0.050 | 0.050 | 0.235 | 2.0 | 14.1 | 36.6 | 34.0 | 0.53 |
| Example 28 | 8.0 | 0.030 | 0.030 | 0.095 | 0.5 | 1.5 | 3.4 | 14.0 | 0.88 |
| Example 29 | 8.0 | 0.000 | 0.000 | 0.095 | 0.5 | 1.5 | 1.5 | 14.0 | 0.88 |
| Example 30 | 9.0 | 0.010 | 0.010 | 0.095 | 5.0 | 10.3 | 12.7 | 39.0 | 0.89 |
| Example 31 | 9.0 | 0.010 | 0.030 | 0.095 | 5.0 | 10.3 | 15.7 | 42.0 | 0.89 |
| Example 32 | 10.0 | 0.030 | 0.030 | 0.095 | 0.5 | 1.9 | 2.8 | 5.0 | 0.80 |
| Example 33 | 10.0 | 0.030 | 0.030 | 0.095 | 0.5 | 1.9 | 2.5 | 4.0 | 0.80 |
| Example 34 | 16.0 | 0.030 | 0.030 | 0.095 | 2.0 | 12.2 | 20.8 | 26.0 | 0.22 |
| Example 35 | 16.0 | 0.030 | 0.030 | 0.095 | 2.0 | 12.2 | 20.8 | 26.0 | 0.19 |
| Example 36 | 10.0 | 0.030 | 0.030 | 0.095 | 2.0 | 7.6 | 13.0 | 26.0 | 1.00 |

Evaluation of the Antiglare Film

The antiglare films were evaluated as follows. It was checked whether an image derived from external light which happened to fall on the antiglare film was unclear or not ('Antiglare property' evaluation), whether the antiglare film had color compensation effects or not ('Color compensation' evaluation), whether the antiglare film was whitely clouded or not ('Whitening' evaluation), whether a phenomenon that a displaying image of an LCD on which the antiglare film was applied was lambent or glaring occurred or not ('Glaring' evaluation), whether the antiglare film appeared whitely blurred or not when illumination of fluorescent light fell on the antiglare film ('White blurring' evaluation), and whether abrasions or scratches were produced on the antiglare film or not if the antiglare layer surface thereof was rubbed ('Abrasion resistance' evaluation). The evaluation is described in detail below.

<Antiglare Property>

The antiglare films obtained in the Examples and Comparative Examples were pasted onto a black plastic plate with a tackiness agent, and the sharpness of the reflected image of the fluorescent lamp and the like on the antiglare films was visually evaluated. The criteria were:
○ (circle): An image derived from fluorescent lamp was hardly observed.
□ (square): An image derived from fluorescent lamp was not significant but observed.
x (cross): An image derived from fluorescent lamp was significant.

<Color Compensation>

The antiglare films obtained in the Examples and Comparative Examples were pasted on a TN type LCD, Diamondcrysta RDT 175LM (manufactured by Mitsubishi Electric Corp.) with a tackiness agent. Then, 15 kinds of color images from JIS (Japanese Industrial Standards) X 9204:2004 were shown on the LCD, preventing external light from falling on the film. An evaluation was performed visually in an oblique direction comparing images through and not through the antiglare film. The criteria were:
○ (circle): Color compensation effect was high.
□ (square): Color compensation effect was lower but still perceivable.
x (cross): Color compensation effect was not perceivable.

<Whitening>

The antiglare films obtained in the Examples and Comparative Examples were pasted onto a black plastic plate with a tackiness agent. While external light was prevented from falling on the antiglare film, degree of whiteness of the antiglare film was visually observed. The criteria were:
○ (circle): No whiteness was observed within the antiglare film.
□ (square): Slight whiteness was perceived within the antiglare film.
x (cross): Whiteness was clearly observed within the antiglare film.

<Glaring>

A glass substrate having a black matrix (BM) thereon with a pattern of 150 ppi was placed on a light table which incorporates a fluorescent lamp. Subsequently, another glass substrate pasted with a color compensating antiglare film obtained in the Examples or Comparative Examples was placed on the glass substrate. Then, glaring of the antiglare film was evaluated visually from a point directly above the film. The criteria were:
○ (circle): No glaring was perceived on the antiglare film.
□ (square): Slight glaring was perceived on the antiglare film.
x (cross): Glaring was clearly perceived on the antiglare film.

<White Blurring>

The antiglare films obtained in the Examples and Comparative Examples were pasted onto a black plastic plate with a tackiness agent. After light of a fluorescent lamp was made to fall on the antiglare film, state of light diffusion by the film was visually evaluated. The criteria were:
○ (circle): No white blurring by light diffusion of the fluorescent lamp occurred.
□ (square): Slight white blurring by light diffusion of the fluorescent lamp was observed.
x (cross): Light of the fluorescent lamp diffused strongly on the film and a white blurring was observed.

<Abrasion Resistance>

The antiglare films obtained in the Examples and Comparative Examples were reciprocatingly rubbed ten laps with a steel wool (#0000) under a load of 500 g/cm$^2$, and changes in appearance such as abrasions or scratches on the antiglare films were visually evaluated. The criteria were:
○ (circle): No changes in appearance were confirmed between before and after rubbing.
□ (square): Slight changes in appearance were confirmed between before and after rubbing.
x (cross): Significant changes in appearance were observed between before and after rubbing.

Table 7 shows an evaluation result of the antiglare films obtained in Examples 1-18 and Comparative Examples 1-6. Table 8 shows an evaluation result of the antiglare films obtained in Examples 19-36 and Comparative Examples 7-12.

TABLE 7

|  | Antiglare property | Color compensation | Whitening | Glaring | White blurring | Abrasion resistance |
|---|---|---|---|---|---|---|
| Example 1 | o | o | o | o | o | o |
| Example 2 | o | □ | o | o | o | o |
| Comparative example 1 | o | □ | x | o | o | o |
| Example 3 | o | □ | o | o | o | o |
| Comparative example 2 | o | o | x | o | o | o |
| Example 4 | o | □ | o | o | o | o |
| Comparative example 3 | o | x | o | o | o | o |
| Example 5 | o | □ | o | o | o | o |
| Comparative example 4 | o | x | x | o | o | o |
| Example 6 | o | o | o | o | o | o |
| Comparative example 5 | o | o | x | o | o | o |
| Example 7 | o | □ | o | o | o | o |
| Comparative example 6 | o | x | o | o | o | o |
| Example 8 | o | o | o | o | o | o |
| Example 9 | o | o | □ | o | o | o |
| Example 10 | o | □ | o | o | o | o |
| Example 11 | o | □ | o | □ | o | o |
| Example 12 | o | o | o | o | o | o |
| Example 13 | o | o | o | o | □ | □ |
| Example 14 | o | □ | o | o | o | o |
| Example 15 | □ | □ | o | o | o | o |
| Example 16 | o | o | o | o | o | o |
| Example 17 | □ | o | o | o | o | o |
| Example 18 | o | □ | o | o | □ | □ |

TABLE 8

|  | Antiglare property | Color compensation | Whitening | Glaring | White blurring | Abrasion resistance |
|---|---|---|---|---|---|---|
| Example 19 | o | o | o | o | o | o |
| Example 20 | o | o | o | o | o | o |
| Comparative example 7 | o | □ | x | o | □ | □ |
| Example 21 | o | □ | o | o | o | o |
| Comparative example 8 | o | o | x | o | o | o |
| Example 22 | o | □ | o | o | o | o |
| Comparative example 9 | o | x | o | o | o | o |
| Example 23 | o | □ | o | o | o | o |
| Comparative example 10 | o | x | x | o | o | o |
| Example 24 | o | o | o | o | o | o |
| Comparative example 11 | o | o | x | o | o | o |
| Example 25 | o | □ | o | o | o | o |
| Comparative example 12 | o | x | o | o | o | o |
| Example 26 | o | o | o | o | o | o |
| Example 27 | o | o | □ | o | o | o |
| Example 28 | o | □ | o | o | o | o |
| Example 29 | o | □ | o | x | o | o |
| Example 30 | o | o | o | o | o | o |
| Example 31 | o | o | o | o | □ | □ |
| Example 32 | o | □ | o | o | o | o |
| Example 33 | □ | □ | o | o | o | o |
| Example 34 | o | o | o | o | o | o |
| Example 35 | □ | o | o | o | □ | □ |
| Example 36 | o | □ | o | o | □ | □ |

What is claimed is:

1. An antiglare film comprising:
   a transparent substrate; and
   an antiglare layer including particles A1, particles A2, particles B, and a binder matrix on said transparent substrate,
   wherein a difference in refractive index between said particles A1 ($n_{A1}$) and said binder matrix ($n_M$) is 0.060 or less,
   wherein a difference in refractive index between said particles A2 ($n_{A2}$) and said binder matrix ($n_M$) is 0.060 or less, wherein a difference in refractive index between said particles B ($n_B$) and said binder matrix ($n_M$) is in the 0.080-0.300 range, wherein an average diameter of said particles B ($r_B$) is in the 0.5-5.0 μm range, wherein a value ($|n_{A1}-n_M|w_{A1}+|n_{A2}-n_M|w_{A2}+|n_B-n_M|w_B$)H, which is a product obtained by multiplying H, an average thickness of said antiglare layer by a sum of $|n_{A1}-n_M|w_{A1}$, a product of multiplication of a difference in refractive index between said particles A1 and said binder matrix by a content (unit: part by weight) of said particles A1 in said antiglare layer with respect to 100 parts by weight of said binder matrix, $|n_{A2}-n_M|w_{A2}$, a product of multiplication of a difference in refractive index between said particles A2 and said binder matrix by a content (unit: part by weight) of said particles A2 in said antiglare layer with respect to 100 parts by weight of said binder matrix, and $n_B-n_M|w_B$, a product of multiplication of a difference in refractive index between said particles B and said binder matrix by a content (unit: part by weight) of said particles B in said antiglare layer with respect to 100 parts by weight of said binder matrix, is in the 2.0-30.0 range, and wherein $r_{A1}/H$, a quotient value of an average diameter of said particles A1 ($r_{A1}$) by an average thickness of said antiglare layer (H), is in the 0.20-0.80 range if said particles A1 have a larger average diameter than said particles A2.

2. An antiglare film comprising:

a transparent substrate; and an antiglare layer including particles A1, particles A2, particles B, and a binder matrix on said transparent substrate, wherein a difference in refractive index between said particles A1 ($n_{A2}$) and said binder matrix ($n_M$) is 0.060 or less, wherein a difference in refractive index between said particles A2 ($n_{A2}$) and said binder matrix ($n_M$) is 0.060 or less, wherein a difference in refractive index between said particles B ($n_B$) and said binder matrix ($n_M$) is in the 0.080-0.300 range, wherein an average diameter of said particles B ($r_B$) is in the 0.5-5.0 μm range, wherein a value ($|n_{A1}-n_M|w_{A1}+|n_{A2}-n_M|w_{A2}+|n_B-n_M|w_B$)H, which is a product obtained by multiplying H, an average thickness of said antiglare layer by a sum of $|n_{A1}-n_M|w_{A1}$, a product of multiplication of a difference in refractive index between said particles A1 and said binder matrix by a content (unit: part by weight of said particles A1 in said antiglare layer with ressect to 100parts by weight of said binder matrix, $|n_{A2}-n_M|w_{A2}$, a product of multiplication of a difference in refractive index between said particles A2 and said binder matrix by a content (unit: part by weight) of said particles A2 in said antiglare layer with respect to 100 parts by weight of said binder matrix, and $|n_B-n_M|w_B$, a product of multiplication of a difference in refractive index between said particles B and said binder matrix by a content (unit: part by weight) of said particles B in said antiglare layer with respect to 100 parts by weight of said binder matrix, is in the 2.0-30.0 range, and wherein in the case where the average diameter of said particles A1 ($r_{A1}$) is larger than that of said particles A2 ($r_{A2}$), $r_{A2}/r_{A1}$ is in the 0.2-0.6 range and $w_{A2}/w_{A1}$, a quotient of a division of the content of said particles A2 in said antiglare layer ($w_{A2}$) with respect to 100 parts by weight of binder matrix by the content of said particles A1 in said antiglare layer ($w_{A1}$) with respect to 100parts by weight of binder matrix, is in the 0.5-2.0 range.

* * * * *